United States Patent
Hong et al.

(10) Patent No.: US 10,048,988 B2
(45) Date of Patent: Aug. 14, 2018

(54) METHOD AND ELECTRONIC DEVICE FOR PROCESSING INTENT

(71) Applicant: SAMSUNG ELECTRONICS CO., LTD, Gyeonggi-do (KR)

(72) Inventors: Young-Joo Hong, Gyeonggi-do (KR); Kyoung-Joong Shin, Seoul (KR); Dong-Gyu Ahn, Gyeonggi-do (KR); Hak-Ryoul Kim, Gyeonggi-do (KR); Hyo-Jong Kim, Gyeonggi-do (KR); Ji-Ho Ma, Gyeonggi-do (KR); Surng-Kyo Oh, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 153 days.

(21) Appl. No.: 14/945,290

(22) Filed: Nov. 18, 2015

(65) Prior Publication Data
US 2016/0142363 A1    May 19, 2016

(30) Foreign Application Priority Data
Nov. 18, 2014   (KR) ................. 10-2014-0160901

(51) Int. Cl.
*G06F 15/16*    (2006.01)
*G06F 9/50*     (2006.01)

(52) U.S. Cl.
CPC .... *G06F 9/5083* (2013.01); *G06F 2209/5017* (2013.01)

(58) Field of Classification Search
None
See application file for complete search history.

(56) References Cited

U.S. PATENT DOCUMENTS

| | | | |
|---|---|---|---|
| 6,223,328 B1* | 4/2001 | Ito ............................ | G06F 1/10 716/113 |
| 2010/0228951 A1 | 9/2010 | Liu | |
| 2011/0206142 A1* | 8/2011 | Sung ....................... | H04L 69/22 375/259 |
| 2012/0214451 A1* | 8/2012 | Richardson ........... | H04W 12/12 455/414.1 |
| 2014/0040242 A1* | 2/2014 | Zhou ................ | G06F 17/30067 707/722 |
| 2014/0282694 A1* | 9/2014 | Zaveri ................ | H04N 21/4882 725/32 |

\* cited by examiner

*Primary Examiner* — Mohamed Ibrahim

(57) ABSTRACT

A method of operating an electronic device includes segmenting a second message in a first message, allocating the segmented second message to at least two queues, and performing a parallel-processing of the first message based on the allocated second message.

13 Claims, 7 Drawing Sheets

METHOD AND ELECTRONIC DEVICE FOR PROCESSING INTENT

CROSS-REFERENCE TO RELATED APPLICATION AND CLAIM OF PRIORITY

The present application is related to and claims the benefit under 35 U.S.C. § 119(a) to a Korean patent application filed in the Korean Intellectual Property Office on Nov. 18, 2014, and assigned Serial No. 10-2014-0160901, the entire disclosure of which is hereby incorporated by reference.

TECHNICAL FIELD

The present disclosure relates generally to a method and electronic device for processing intent.

BACKGROUND

With advances in information communication technology and semiconductor technology, various electronic devices are evolving to multimedia devices for providing various multimedia services. For example, an electronic device offers various multimedia services such as a messenger service, a broadcasting service, a wireless Internet service, a camera service, and a music play service.

The electronic device includes software platforms for providing those services. For example, mobile software platforms in a smart phone include middleware and applications to provide various services to a user based on a general-purpose operating system. Such mobile software platforms may be divided largely into a public type which provides an application programming interface (API) to a developer and an open source type that may be shared in public. The public mobile software platforms include Symbian, Windows Mobile, and iOS. The open-source type corresponds to Linux-based LiMo and Android. For example, an intent (such as a message) in an Android framework structure is designed to give a control right to a next receiver once one receiver completes its processing.

A conventional Android framework structure sends an intent to a next receiver after one receiver receives and processes the intent (such as the message). Accordingly, when a great number of receivers receive the intent, an additional intent needs to wait for the existing intent processing to be completed. When a particular receiver in a receiver list for receiving the intent delays its processing, the subsequent receivers stand by. As a result, an intent processing time is extended and a performance is degraded.

SUMMARY

To address the above-discussed deficiencies, it is a primary object to provide a method and an electronic device for processing an intent to reduce an intent processing time.

In accordance with an embodiment, a method for operating an electronic device is provided. In this example, the method includes segmenting a second message in a first message, and allocating the segmented second message to at least two queues. The method further includes performing a parallel-processing the first message based on the allocated second message. An apparatus for performing this method is also provided.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
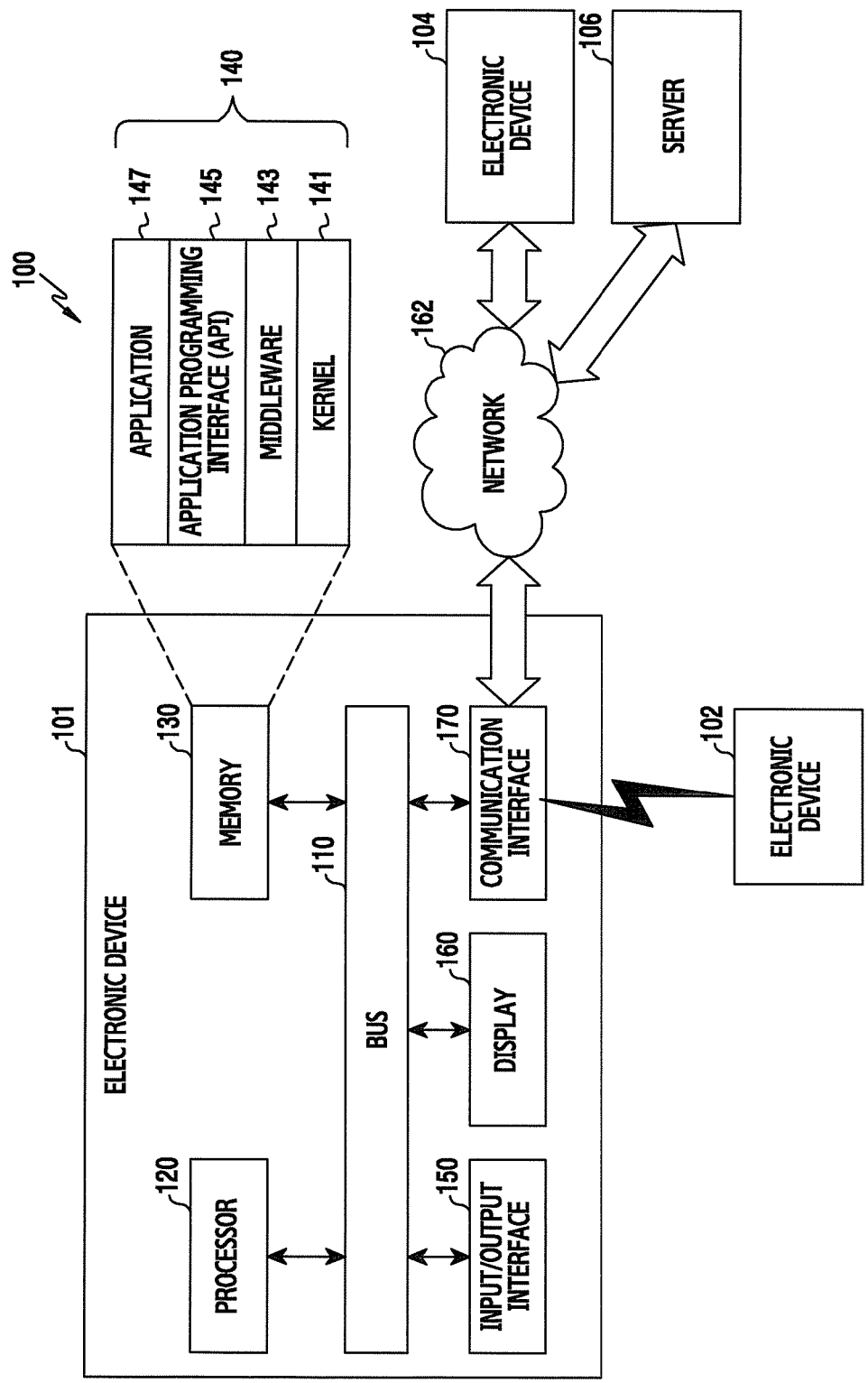
FIG. 1 is a block diagram of an example network configuration of an electronic device according to the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, the present disclosure is described with reference to the accompanying drawings. The present disclosure may be changed variously and have various embodiments, and specific embodiments are exemplarily described and related detailed descriptions are made in the present specification. However, it should be understood that the various embodiments of the present disclosure are not limited to a specific embodied form and include all modifications and/or equivalents or substitutions that fall within the spirit and technical scope of the present disclosure. In the drawing, like reference numerals are used for like elements.

Expressions such as "include" or "may include", etc. that may be used for the present disclosure indicate existence of a disclosed relevant function, operation, or element, etc., and do not limit additional one or more functions, operations, or elements, etc. Also, it should be understood that terminologies such as "include" or "have", etc. in the present disclosure are intended for designating existence of a characteristic, a number, a step, an operation, an element, a part, or a combination of these described on the specification and do not exclude in advance existence or addition possibility of one or more other characteristics, numbers, steps, operations, elements, parts, or a combination of these.

Expression such as "or", etc. in the present disclosure includes a certain and all combinations of words listed together. For example, "A or B" may include A and may include B, or include both A and B.

In the present disclosure, expressions such as "1st", "2nd", "first" or "second", etc. may modify various elements of the present disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of the present disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

A terminology used in the present disclosure is used for explaining only a specific embodiment and is not intended for limiting the present disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the present disclosure belongs. It should be understood that generally used terminologies defined by a dictionary have meaning coinciding with meaning on context of a related technology, and unless clearly defined in the present disclosure, they are not understood as an ideal or excessively formal meaning.

An electronic device according to the present disclosure may be a device including a communication function. For example, an electronic device can include at least one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (such as a head-mounted-device (HMD) such as electronic glasses, an electronic clothing, an electronic bracelet, an electronic necklace, an electronic appcessory, an electronic tattoo, or a smartwatch).

According to certain embodiments, an electronic device can be a smart home appliance having a communication function. A smart home appliance may include, for example, at least one of a television, a Digital Video Disk (DVD) player, an audio, a refrigerator, an air conditioner, a cleaner, an oven, an electronic range, a washing machine, an air purifier, a set-top box, a TV box (such as such as SAMSUNG HOMESYNC™, APPLE TV™, GOOGLETV™, or the like), game consoles, an electronic dictionary, an electronic key, a camcorder, or an electronic frame.

According to certain embodiments, an electronic device can include at least one of various medical devices (such as Magnetic Resonance Angiography (MRA), Magnetic Resonance Imaging (MRI), Computed Tomography (CT), a shooting device, an ultrasonic device, etc.), a navigation device, a Global Positioning System (GPS) receiver, an event data recorder (EDR), a flight data recorder (FDR), an automobile infotainment device, electronic equipment for a ship (such as a navigation device for a ship, a gyro compass, etc.), an avionics, a security device, or a robot for an industrial use or a home use.

According to certain embodiments, an electronic device can include at least one of a furniture or a portion of a building/structure including a communication function, an electronic board, an electronic signature receiving device, a projector, or various measurement devices (such as waterworks, electricity, gas, or radio wave measuring device, etc.). An electronic device according to the present disclosure may be a combination of one or more of the above-described devices. Also, it is obvious to a person of ordinary skill in the art that the electronic device according to the present disclosure is not limited to the above-described devices.

Hereinafter, an electronic device according to various embodiments of the present disclosure is described with reference to the accompanying drawings. A terminology of a user used in various embodiments may indicate a person who uses an electronic device or a device (such as an artificial intelligence electronic device) that uses the electronic device.

FIG. 1 is a block diagram illustrating a network environment 100 including an electronic device 101 according to various embodiments. As illustrated in FIG. 1, the electronic device 101 includes a bus 110, a processor 120, a memory 130, an input/output (I/O) interface 150, a display 160, and a communication interface 170.

The bus 110 is a circuit for connecting the above-described elements with each other, and transferring communication (such as a control message) between the above-described elements.

The processor 120 includes a central processing unit (CPU), a communication processor (CP), and a graphic processing unit (GPU).

The processor 120 receives, for example, an instruction from the above-described other elements (such as the memory 130, the I/O interface 150, the display 160, or the communication interface 170, etc.) via the bus 110, deciphers the received instruction, and executes an operation or a data process corresponding to the deciphered instruction.

The processor 120 is configured to segment a second message of a first message, allocate the segmented second message to at least two queues, and perform a parallel-processing of the first message based on the allocated second message. Herein, the first message includes an intent message, and the second message includes receiver information. The queue includes, but is not limited to, a broadcast queue.

The processor 120 evenly segments the second message of the first message. The processor 120 segments the second message based on a processing time of each receiver corresponding to the second message. The processor 120 segments the second message based on a throughput of each receiver corresponding to the second message.

The processor 120 generates the at least two queues. For example, the processor 120 generates the queues as many as central processing unit (CPU) cores of the electronic device 101. For example, the processor 120 changes a number of the queues based on the CPU usage rate of the electronic device 101. For example, the processor 120 changes the number of the queues based on a total processing time of the CPU of the electronic device 101.

The first message includes at least one of a BOOT_COMPLETED intent message and a MEDIA_SCANNER_FINISHED intent message. The second message includes at least one of a command of each receiver corresponding to the second message, source code, a number of the receivers, receiver identification information, and a receiver identity (ID).

The memory 130 stores an instruction or data received from the processor 120 or other elements (such as the I/O interface 150, the display 160, or the communication interface 170, etc.), or generated by the processor 120 or other elements. The memory 130 includes, for example, programming modules 140 such as a kernel 141, a middleware 143, an application programming interface (API) 145, or an application 147. The each of the programming modules is configured using a software, a firmware, a hardware, or a combination of thereof.

The kernel 141 controls or manages system resources (such the bus 110, the processor 120, or the memory 130, etc.) used for executing an operation or a function implemented in the rest of the programming modules, for example, the middleware 143, the API 145, or the application 147. Also, the kernel 141 provides an interface for allowing the middleware 143, the API 145, or the application 147 to access an individual element of the electronic device 101 and controls or manages the same.

The middleware 143 performs a mediation role so that the API 145 or the application 147 communicates with the kernel 141 to exchange data. Also, in connection with task requests received from the applications 147, the middleware 143 performs a control (such as scheduling or load balancing) for a task request using, for example, a method of assigning priority that uses a system resource (such as the bus 110, the processor 120, or the memory 130, etc.) of the electronic device 101 to at least one application 134.

The API 145 is an interface for allowing the application 147 to control a function provided by the kernel 141 or the middleware 143, and includes at least one interface or function (such as an instruction) for a file controlling, a window controlling, an image processing, or a character controlling, etc.

According to various embodiments, the application 147 includes a short message service/multimedia messaging service (SMS/MMS) application, an e-mail application, a calendar application, an alarm application, a health care application (such as an application for measuring quantity of motion or blood sugar, etc.), or an environment information application (such as an application providing an atmospheric pressure, humidity or temperature information, etc.). Additionally or alternatively, the application 147 is an application related to information exchanged between the electronic device 101 and an external electronic device (such as the electronic device 102 or 104). The application related to the information exchanging includes, for example, a notification relay application for transferring specific information to the external electronic device or a device management application for managing the external electronic device.

For example, the notification relay application includes a function for transferring notification information generated from a different application (such as an SMS/MMS application, an e-mail application, a health care application, or an environment information application) of the electronic device 101 to an external electronic device (such as the electronic device 102 or 104). Additionally or alternatively, the notification relay application, for example, receives notification information from an external electronic device (such as the electronic device 102 or 104) and provides the same to a user. The device management application manages (such as install, delete, or update) a function (such as turn-on/turn-off of an external electronic device itself, some constituent part, a luminance controlling or a resolution controlling of a display) of an external electronic device (such as the electronic device 102 or 104) communicating with the electronic device 101 and an application operating in the external electronic device or a service (such as a communication service or a message service) provided by the external electronic device.

According to various embodiments, the application 147 includes a designated application depending on an attribute (such as a kind of an electronic device) of the external electronic device (such as the electronic device 104). For example, in the case where the external electronic device is an MP3 player, the application 147 includes an application related to music reproduction. Similarly, in the case where the external electronic device is a mobile medical health care device, the application 147 includes an application related to a health care. According to an embodiment, the application 147 includes at least one of an application designated in the electronic device 101 and an application received from the external electronic device (such as the server 106, the electronic device 102 or 104).

The I/O interface 150 transfers an instruction or data input from a user via an I/O unit (such as a sensor, a keyboard, or a touchscreen) to the processor 120, the memory 130, or the communication interface 170 via the bus 110. For example, the I/O interface 150 provides data regarding a user's touch input via a touchscreen to the processor 120. Also, the I/O interface 150, for example, output an instruction or data received via the bus 110 from the processor 120, the memory 130, or the communication interface 170 via the I/O unit (such as a speaker or a display). For example, the I/O interface 150 output voice data processed by the processor 120 to a user via a speaker.

The display 160 includes, for example, a liquid crystal display (LCD), a light emitting diode (LED) display, an organic light emitting diode (OLED) display, a micro electro mechanical system (MEMS) display, or an electronic paper display. The display 160 displays various types of contents (such as text, images, videos, icons, or symbols) for users. The display 160 includes a touch screen. The display 160 receives, for example, a touch, a gesture, a proximity, or a hovering input by using an electronic pen or a part of the user's body.

According to an embodiment, the display 160 displays a contact list based on a priority of each of the contacts included in the contact list. For example, the priority of the contacts is determined based on at least one of a transmission history, a transmission frequency, a transmission speed, a charging policy, an intimacy, a counterpart's location, a schedule, or an application preference.

According to an embodiment, the display 160 displays a service list based on a priority of each of the applications or services included in the service list. For example, the priority of the applications or services is determined based on configuration information of a service provider, configuration information of a manufacturer, contact information, an application preference, a user preference, a use time point, a distance from a target to share contents, a transmission history, and a charging policy.

The communication interface 170 connects communication between the electronic device 101 and an external device (such as the electronic device 104 or the server 106). For example, the communication interface 170 is connected to a network 162 through a wireless communication system or a wired communication system, and communicates with an external device.

The wireless communication system uses at least one of air interface protocols, for example, long term evolution (LTE), LTE-advance (LTE-A), code division multiple access (CDMA), wideband CDMA (W-CDMA), universal mobile telecommunications system (UMTS), wireless broadband (WiBro), and global system for mobile communications (GSM) as a cellular communication protocol.

The wireless communication system includes at least one of communication protocols, for example, WiFi, Bluetooth, bluetooth low energy (BLE), Zigbee, infrared (IR) communication, and ultrasonic communication as a short-range communication protocol 164.

The wired communication system includes at least one of connectivities, for example, a universal serial bus (USB), a high definition multimedia interface (HDMI), a recommended standard 232 (RS-232), and a plain old telephone service (POTS).

The network 162 includes at least one of communication networks such as a computer network (such as LAN or WAN), the Internet, and a telephone network.

The electronic devices 102 and 104 are devices of the same type as that the electronic device 101 or devices of different types from that of the electronic device 101. According to an embodiment, the server 106 includes a group of one or more servers. According to various embodiments, all or some of the operations executed in the electronic device 101 is carried out in another electronic device or a plurality of electronic devices (such as the electronic device 102 or 104, and the server 106). According to an embodiment, when the electronic device 101 performs some functions or services automatically or by a request, the electronic device 101 makes a request for performing at least some functions related to the functions or services to another device (such as the electronic device 102 or 104, or the server 106) instead of performing the functions or services by itself or additionally. The electronic device (such as the electronic device 102 or 104, or the server 106) carries out the functions requested by the electronic device 101 or additional functions, and provide results thereof to the electronic device 101. The electronic device 101 provides the requested functions or services to another electronic device based on the received results or after additionally processing the received results. To this end, for example, a cloud computing, a distributed computing, or a client-server computing technology are used.

An electronic device includes a display; and a processor functionally connected to the display. The processor segments a second message of a first message, allocate the segmented second message to at least two queues, and perform a parallel-processing of the first message based on the allocated second message.

The processor evenly segments the second message in the first message.

The processor segments the second message according to a processing time of each receiver corresponding to the second message.

The processor segments the second message according to a throughput of each receiver corresponding to the second message.

The processor generates the at least two queues.

The processor generates the queues as many as CPU cores of the electronic device.

The processor changes a number of the queues based on a CPU usage rate of the electronic device.

The processor changes the number of the queues based on a total CPU processing time of the electronic device.

The first message includes at least one of a BOOT_COMPLETED intent message or a MEDIA_SCANNER_FINISHED intent message.

The second message includes a command of each receiver corresponding to the second message, a source code, a number of receivers, a receiver identification information, a receiver ID, or a combination of thereof.

Figure 2:
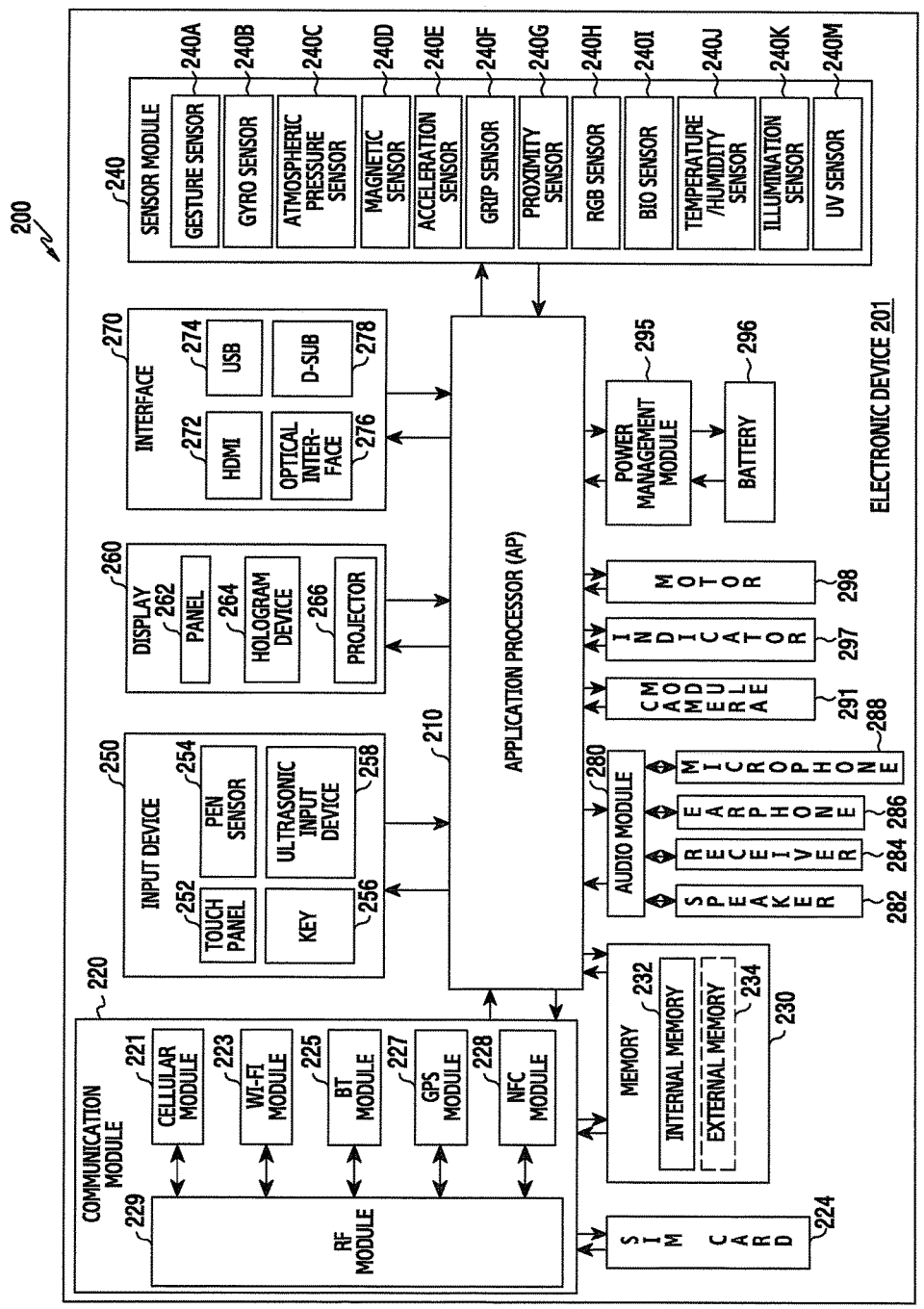
FIG. 2 is a block diagram of an example configuration of an electronic device according to the present disclosure.

FIG. 2 is a block diagram of an example configuration 200 of an electronic device according to the present disclosure. An application processor (AP) 210 is connected with a communication module 220, a memory module 230, a sensor module 240, an input device module 250, a display module 260, an interface module 270, an audio module 280, a camera module 291, a power management module 295, a battery 296, an indicator 297, and a motor 298. As illustrated in FIG. 2, the AP 210 communicates with the above external modules.

Figure 3:
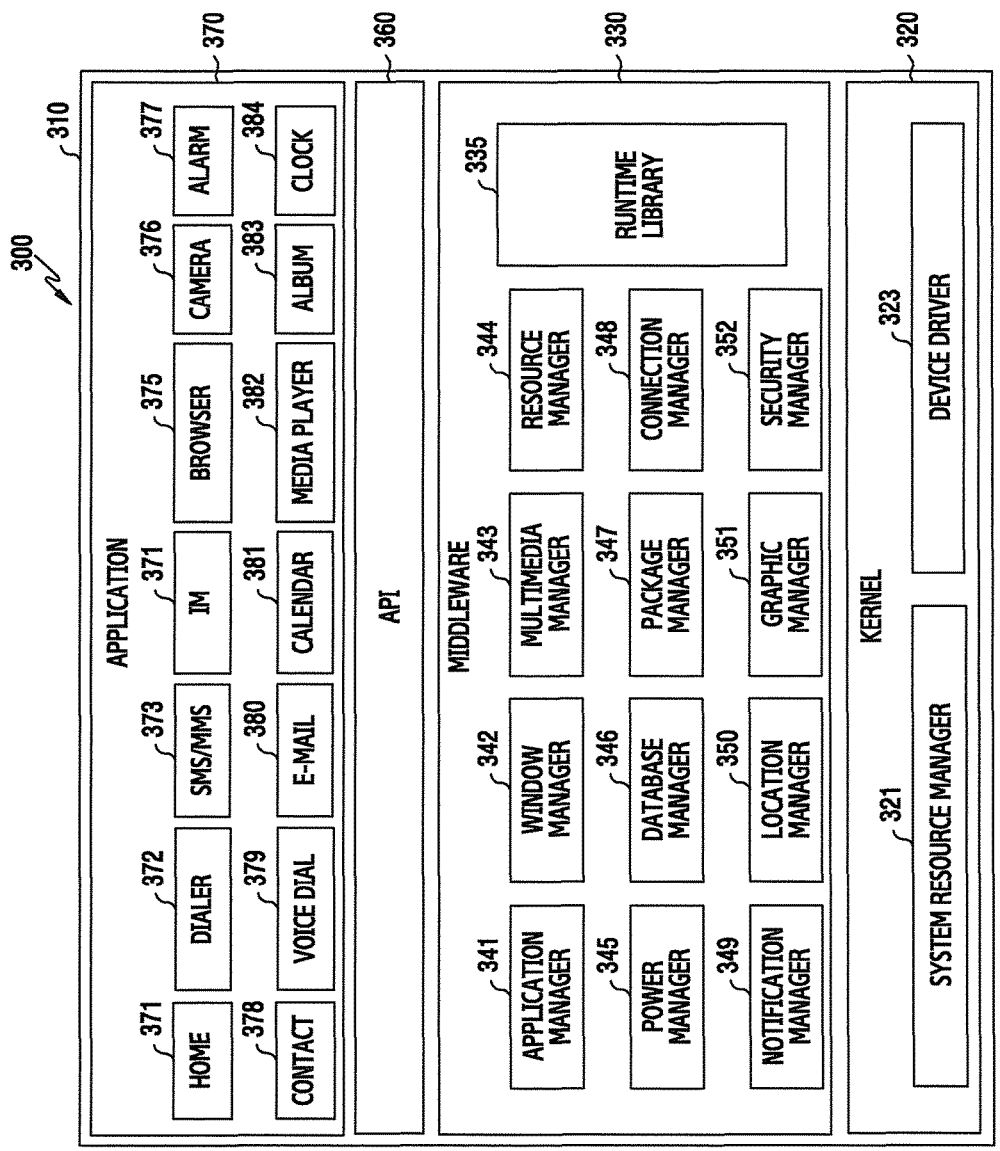
FIG. 3 is a block diagram of an example program module according to the present disclosure.

FIG. 3 is a block diagram of an example program module 300 according to the present disclosure. The program module 300 comprises an application 310, an application program interface (API) 360, a middle ware 330, and a kernel 320. As illustrated in FIG. 3 each program module communicates each other.

Figure 4:
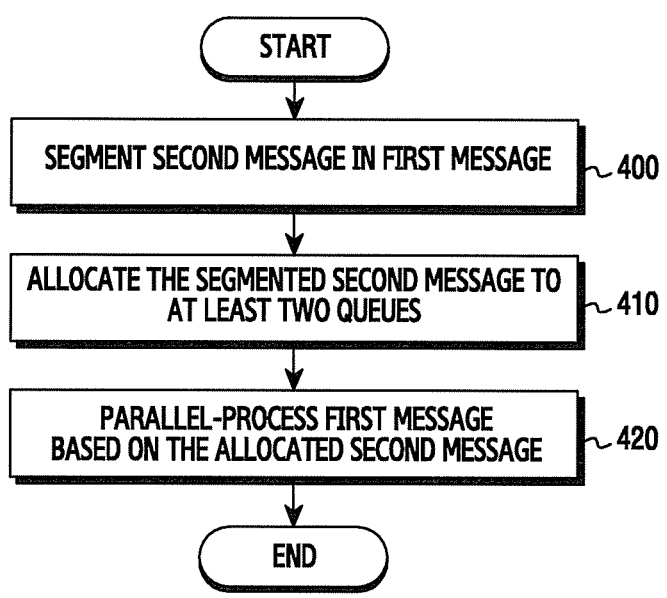
FIG. 4 is a flowchart of an example method for parallel-processing of a first message according to the present disclosure.

FIG. 4 is a flowchart of an example method 400 for a parallel-processing of a first message according to the present disclosure.

As illustrated in FIG. 4, at step 400, an electronic device (such as, the electronic device 101) segments the second message of the first message. Herein, the first message includes, but not limited to, the BOOT_COMPLETED intent message and the MEDIA_SCANNER_FINISHED intent message of Android platform. The first message includes a command code for realizing the operations of the electronic device. The second message includes, for example, a command, receiver information, and a source code, for the corresponding receiver to process a particular task. The second message includes receiver related information (such as the number of the corresponding receivers, receiver identification information, receiver ID, etc.) to receive the first message.

The electronic device evenly segments the second message of the first message. The electronic device analyzes the second message in the first message and segment the second message based on the processing time of each receiver. For example, the electronic device obtains the processing times of the receivers and segments the second message such that the processing times of the receivers become similar with one another.

At step 410, the electronic device allocates the segmented second message to at least two queues. Herein, the queues include a broadcast queue. For example, the electronic device generates an additional queue and sends the segmented second message to the generated queue. The electronic device generates the queues as many as the CPU cores of the electronic device. The electronic device changes a number of the queues based on the CPU usage rate or the usage. The electronic device changes the number of the queues based on the total processing time of the CPU. For example, when processing the first message, the electronic device determines the number of the subsequent queues by measuring the CPU usage rate and the total CPU processing time for reference times.

When the CPU usage rate is lower and the CPU processing time is reduced at a particular time, the electronic device increases the number of the queues by one. By contrast, When the CPU usage rate is higher and the CPU processing time increases at a particular time, the electronic device decreases the number of the queues by one. The electronic device varies reference values for the CPU usage rate, the processing time, and/or the measurement count.

For example, when the reference value of the CPU usage rate is about 90%, the reference value of the processing time is about one second, and the reference value of the measurement count is about 10 times, the electronic device measures and averages the CPU usage rate and the CPU processing time of the corresponding first message about 10 times. Next, when the CPU usage rate falls below 90% or so and/or the processing time decreases by one second or so in the first message processing, the electronic device increases the number of the queues by one. By contrast, when the CPU usage rate exceeds 90% or so and/or the processing time increases by one second or so in the first message processing, the electronic device decreases the number of the queues by one.

At step 420, the electronic device performs a parallel-processing of the first message based on the allocated second message. The allocated second message is transferred to the receivers corresponding to the second message. Each receiver executes a particular command based on the corresponding second message. As the electronic device performs the parallel-processing of the first message, a booting speed of the electronic device and a user interface display speed (such as Wi-Fi icon display, BT icon display) is enhanced. Several problems (such as SIM card recognition delay, international mobile station equipment identity (IMEI) recognition delay, etc.) caused by an intent processing delay are addressed.

Figure 5:
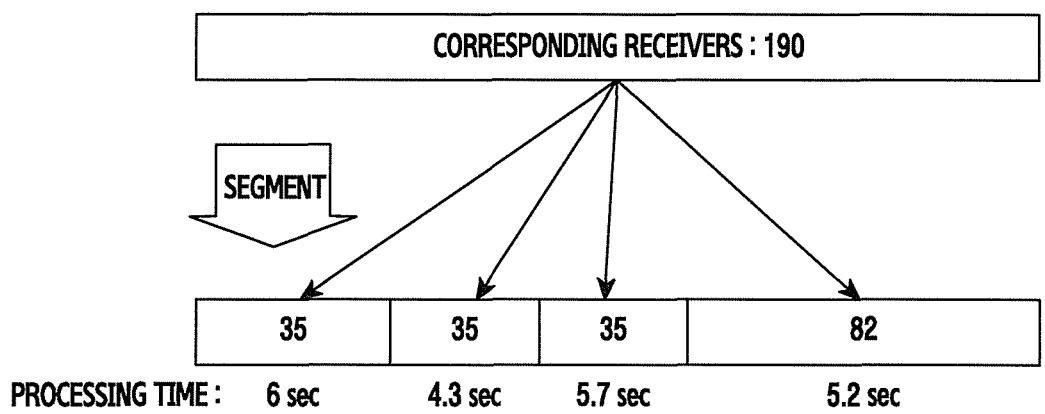
FIG. 5 is a diagram of an example first message segmentation according to the present disclosure.

FIG. 5 is a diagram of an example first message segmentation 500 according to the present disclosure. As illustrated in FIG. 5, an electronic device obtains a number of receivers (such as 190 receivers) corresponding to the first message (such as the intent message). The electronic device predicts the processing time of the corresponding receiver based on the second message (such as the receiver information) of the first message, and groups or divides the second message into a plurality of (such as about four) segments based on the predicted processing time of the corresponding receiver. The electronic device segments the first message by taking into account the time required to process the first message.

The electronic device analyzes the second message in the first message, and segment the second message according to a throughput of each receiver. For example, the electronic device obtains the throughput of the receivers and segments the second message so that the throughput of the receivers becomes similar with one another. The electronic device segments the second message based on the corresponding receiver information (such as the receiver identification information).

Figure 6:
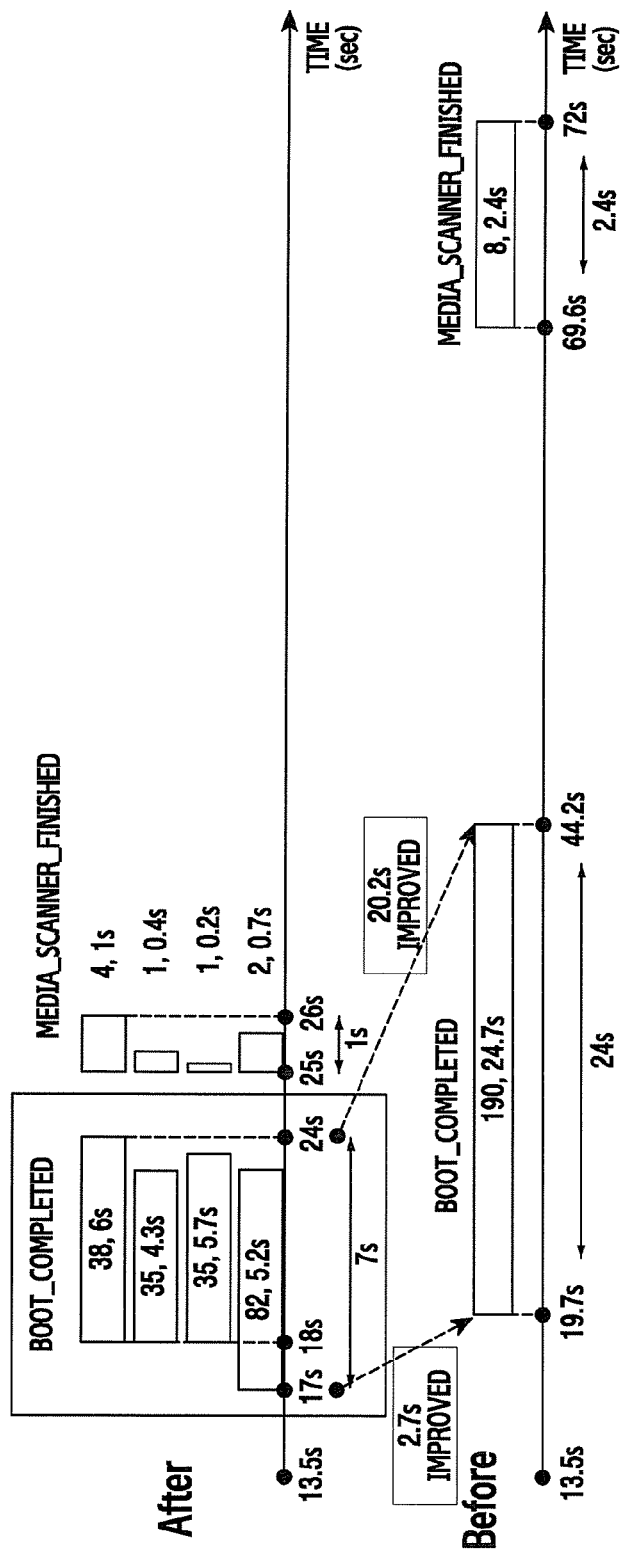
FIG. 6 is a diagram of an example first message processing time according to the present disclosure.

FIG. 6 is a diagram of an example first message processing time 600 when the first message performs a parallel-processing according to the present disclosure.

As illustrated FIG. 6, an electronic device (such as the electronic device 101) processes a first message (such as the BOOT_COMPLETED intent message and the MEDIA_SCANNER_FINISHED intent message) using one queue, and performs a parallel-processing of the first message using a plurality of queues.

For example, the BOOT_COMPLETED intent message of Android operating system indicates 190 receiver processing times to be handled. The MEDIA_SCANNER_FINISHED intent message indicates 8 receiver processing times to be handled. The electronic device divides receiver information of the BOOT_COMPLETED intent message into a plurality of segments (such as four) and sends them to a plurality of queues (such as four). The electronic device divides receiver information of the MEDIA_SCANNER_FINISHED intent message into a plurality of segments (such as four) and sends them to a plurality of queues (such as four).

The electronic device evenly segments the receiver information in each intent message (such as the BOOT_COMPLETED intent message, the MEDIA_SCANNER_FINISHED intent message). The electronic device analyzes the receiver information of the intent message and segments the receiver information based on the processing time of each he receiver. For example, the electronic device obtains the processing times of the receivers and segments the receiver information so that the processing times of the receivers become similar with one another.

The electronic device analyzes the receiver information in the intent message and segment the receiver information based on the throughput of each receiver. For example, the electronic device obtains the throughput of the receivers and segments the receiver information so that the throughput of the receivers becomes similar with one another. Hence, unlike a conventional method for processing the intent message using a single queue, the electronic device perform parallel-processing of the intent message using the multiple (such as four) queues.

When the electronic device segments and performs a parallel-processing of the BOOT_COMPLETED intent message, a processing start of the BOOT_COMPLETED intent message is improved by about 2.7 seconds (such as 13.7%), and a processing time of the BOOT_COMPLETED intent message is improved by about 17 seconds (such as 70.8%). When the electronic device segments and performs a parallel-processing of the MEDIA_SCANNER_FINISHED intent message, a processing start of the MEDIA_SCANNER_FINISHED intent message is improved by about 44.6 seconds (such as 64.1%), and a processing time of the MEDIA_SCANNER_FINISHED intent message is improved by about 1.4 seconds (about 58.3%).

While the BOOT_COMPLETED intent message and the MEDIA_SCANNER_FINISHED intent message are described by way of example, the processing start and the processing speed of most intent messages are enhanced.

A processing completion of the BOOT_COMPLETED intent message is improved by 20 seconds or so (such as 45 sec→25 sec) compared with a conventional method. Hence, when receiving the BOOT_COMPLETED intent message, the electronic device performs the booting about 20 seconds faster. After completing the booting, the electronic device improves the Wi-Fi access point (APO connection speed by about 20 seconds, the BT icon display by about one second, and the Wi-Fi icon display by about one second. Besides the above-stated user interface, the time required executing every operation in the electronic device and the user interface is shortened. In addition, the electronic device addresses several problems (such as SIM card recognition delay, IMEI recognition delay, etc.) caused by the intent processing delay.

Figure 7:
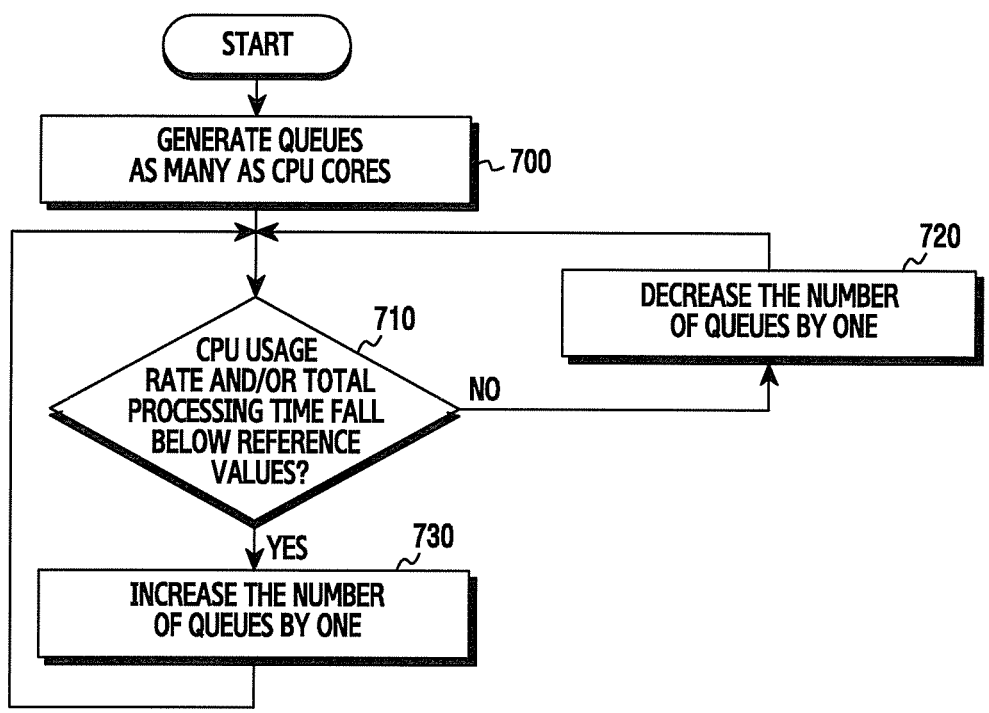
FIG. 7 is a flowchart of an example method for generating a queue according to the present disclosure.

FIG. 7 is a flowchart of an example method 700 for generating a queue according to the present disclosure.

As illustrated in FIG. 7, at step 700, an electronic device (such as the electronic device 101) generates queues as many as the CPU cores. Herein, the queues include a broadcast queue. For example, when a number of the CPU cores of the electronic device is four, the electronic device generates four queues as many as the CPU cores.

At step 710, the electronic device determines whether the CPU usage rate or usage, and/or a total CPU task processing time fall below reference values. While processing the first message (such as the BOOT_COMPLETED intent message or the MEDIA_SCANNER_FINISHED intent message) allocated to the generated queues, the electronic device determines whether the CPU usage rate or usage, and/or the total CPU task processing time fall below or exceed the reference values. For example, while processing the first message, the electronic device adjusts a number of the queues by measuring the CPU usage rate and the total processing time for reference times. The reference value of the CPU usage rate is, but not limited to, about 90%, and the reference value of the total CPU processing time is, but not limited to, about one second. The reference values of the CPU usage rate or usage, and the total CPU task processing time varies according to a CPU performance.

When the CPU usage rate or usage, and/or the total CPU task processing time exceed the reference values, the electronic device decreases the number of the queues by one in operation 720. For example, when the CPU usage rate of the electronic device exceeds about 90% and/or the total CPU task processing time exceeds about one second, the electronic device maintains three queues by decreasing the generated four queues by one.

By contrast, when the CPU usage rate or usage, and/or the total processing time fall below the reference values, the electronic device increases the number of the queues by one at step 730. For example, when the CPU usage rate of the electronic device falls below about 90% and/or the total CPU processing time falls below about one second, the electronic device maintains five queues by increasing the generated four queues by one.

The electronic device adjusts the queues by one according to, but not limited to, the CPU usage rate or usage, and/or the total CPU processing time. For example, the electronic device changes the number of the queues according to the CPU usage rate or usage, and/or the total CPU processing time. The electronic device adequately controls the number of queues by periodically checking the CPU usage rate and/or the total CPU processing time at a particular time or at particular time intervals.

In certain embodiments, an electronic device includes segmenting of a second message in a first message, allocating the segmented second message to at least two queues, and then performs a parallel-processing of the first message based on the allocated second message. In such embodiment, the segmenting includes evenly segmenting the second message of the first message, segmenting the second message according to a processing time of each receiver corresponding to the second message, and segmenting the second message according to a throughput of each receiver corresponding to the second message.

In addition, at least two queues are generated as many as CPU cores of the electronic device. In one embodiment, the number of the queues is changed based on a CPU usage rate of the electronic device is changed. In another embodiment, the number of the queues is changed based on a total CPU processing time of the electronic device.

Furthermore, the first message includes at least one of a BOOT_COMPLETED intent message and a MEDIA_SCANNER_FINISHED intent message.

The second message includes at least one of a command of each receiver corresponding to the second message, a source code, a number of receivers, receiver identification information, and a receiver Identifier (ID).

The term "module" used in an embodiment of the present disclosure indicates, for example, a unit including a combination of one or more of hardware, software, or firmware. The "module" may be interchangeably used with the terms, for example, "a unit," "logic," "a logical block," "a component," or "a circuit." The "module" may be a minimum unit or part of the components integrally formed. The "module" may be a minimum unit or part of one or more functions. The "module" may be implemented mechanically or electronically. For example, the "module" may include at least one of an application-specific integrated circuit (ASIC), a field-programmable gate array (FPGA), or a programmable-logic device for performing operations which are well known or will be developed.

At least part of the device (such as the modules or the functions) or the method (such as, the operations) described in the appended claims and/or the specifications of the present disclosure may be implemented using, for example, instructions stored as the program module in a non-transitory computer-readable storage medium. For example, when an instruction is executed by one or more processors (such as the processor 120), the one or more processors perform the corresponding function. The non-transitory computer-readable storage medium may be, for example, the memory 130.

The non-transitory computer-readable recording medium can include magnetic media such as a hard disk, a floppy disk and a magnetic tape, an optical media such as a compact disc read only memory (CD-ROM) and a digital versatile disc (DVD), magneto-optical media such as a floptical disk, and hardware devices specifically configured to store and execute an application instruction (such as the programming module) such as a read only memory (ROM), a random access memory (RAM), and a flash memory. A program instruction may include not only machine code made by a compiler but also high-level language code executable by a computer using an interpreter. The above-stated electronic device may serve as one or more software modules for fulfilling the operations of an embodiment of the present disclosure, and vice versa.

The module or the programming module according to an embodiment of the present disclosure may include at least one of the aforementioned components, omit some components, or further include other components. The operations fulfilled by the modules, the programming modules, or other components may be carried out in sequence, in parallel, repeatedly, or heuristically. In addition, some operations may be executed in a different order or omitted, or other operations may be added.

As set forth above, the intent processing method and the electronic device thereof segment and parallel-process the intent message, thus reducing the intent processing time and addressing the problems (such as SIM card recognition delay, IMEI recognition delay, etc.) caused by the intent processing delay.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating an electronic device, the method comprising:
    acquiring an intent message including information on a plurality of receivers, each of the plurality of receives being a portion of an application;
    segmenting the intent message into a plurality of sub-messages to be processed by the plurality of receives respectively;
    grouping, based on a processing time for which the plurality of receivers respectively process the plurality of sub-messages, the plurality of sub-messages into at least two groups, wherein a processing of each of the at least two groups is completed at a same time by at least one receiver corresponding to the each of the at least two groups, wherein a number of the at least two groups is equal to a number of a plurality of queues which are associated with a central processing unit (CPU);
    allocating the at least two groups to the plurality of queues; and
    transmitting, to the plurality of receivers, the plurality of sub-messages from the plurality of queues.

2. The method of claim 1, further comprising:
    generating the plurality of queues, wherein the number of the plurality of queues is equal to a number of CPU cores associated with the electronic device.

3. The method of claim 2, further comprising: changing the number of the plurality of queues based on a CPU usage rate of the electronic device.

4. The method of claim 2, further comprising:
    changing the number of the plurality of queues based on a total time of CPU processing time of the electronic device.

5. The method of claim 1, wherein the intent message comprises at least one of a BOOT_COMPLETED intent message or a MEDIA_SCANNER_FINISHED intent message.

6. The method of claim 1, wherein the information on the plurality of receivers comprises at least one of a command on the plurality of receivers, a source code, a number of the plurality of receivers, receiver identification information, and a receiver identifier (ID).

7. An electronic device comprising:
    a display configured to functionally connected to at least one processor; and
    the at least one processor configured to:
        acquire an intent message including information on a plurality of receivers, each of the plurality of receivers being a portion of an application;
        segment the intent message into a plurality of sub-messages to be processed by the plurality of receivers respectively;
        group, based on a processing time for which the plurality of receivers respectively processes the plurality of sub-messages, the plurality of sub-messages into at least two groups, wherein a processing of each of the at least two groups is completed at a same time by at least one receiver corresponding to the each of the at least two groups, wherein a number of the at least two groups is equal to a number of a plurality of queues which are associated with a central processing unit (CPU);
        allocate the at least two groups to the plurality of queues; and
        transmit, to the plurality of receivers, the plurality of sub-messages from the plurality of queue.

8. The electronic device of claim 7, wherein the at least one processor is further configured to generate the plurality of queues, wherein the number of the plurality of queues is equal to a number of CPU cores associated with the electronic device.

9. The electronic device of claim 7, wherein the at least one processor is further configured to change a number of the plurality of queues based on a CPU usage rate of the electronic device.

10. The electronic device of claim 7, wherein the at least one processor is further configured to change a number of the plurality of queues based on a total time of CPU processing time of the electronic device.

11. The electronic device of claim 7, wherein the message comprises at least one of a BOOT_COMPLETED intent message or a MEDIA_SCANNER_FINISHED intent message.

12. The electronic device of claim 7, wherein the information on the plurality of receivers comprises at least one of a command on the plurality of receivers, a source code, a number of receivers, receiver identification information, and a receiver identifier (ID).

13. A non-transitory computer-readable storage medium for storing one or more programs for executing operations of:
    acquiring an intent message including information on a plurality of receivers, each of the plurality of receivers being a portion of an application;
    grouping, based on a processing time for which the plurality of receivers respectively process a plurality of sub-messages, the plurality of sub-messages into at least two groups, wherein a processing of each of the at least two groups is completed at a same time by at least one receiver corresponding to the each of the at least two groups, wherein a number of the at least two groups is equal to a number of a plurality of queues which are associated with a central processing unit (CPU);
    allocating the at least two groups to a plurality of queues; and
    transmitting, to the plurality of receivers, the plurality of sub-messages from the plurality of queues.

* * * * *